LOW INSERTION FORCE CONNECTOR

Filed Jan. 29, 1968 3 Sheets-Sheet 1

INVENTORS.
WILLIAM S. SCHEINGOLD
GEZA P. BOTTLIK
GERALD J. SELVIN
ALAN S. KRUM
BY Martin L. Faigus
AGENT.

INVENTORS.
WILLIAM S. SCHEINGOLD
GEZA P. BOTTLIK
GERALD J. SELVIN
ALAN S. KRUM
BY Martin L. Faigus
AGENT.

INVENTORS.
WILLIAM S. SCHEINGOLD
GEZA P. BOTTLIK
GERALD J. SELVIN
ALAN S. KRUM
BY. Martin L. Faigus
AGENT.

United States Patent Office 3,553,630

Patented Jan. 5, 1971

3,553,630

LOW INSERTION FORCE CONNECTOR

William S. Scheingold, Trevose, Geza P. Bottlik, Rydal, Gerald J. Selvin, Oreland, and Alan S. Krum, Philadelphia, Pa., assignors to Elco Corporation, Willow Grove, Pa., a corporation of Delaware Filed Jan. 29, 1968, Ser. No. 701,391

Int. Cl. H01r *13/62*

U.S. Cl. 339—74 6 Claims

ABSTRACT OF THE DISCLOSURE

An electrical connector has a circuit board receiving area therein for receiving an edge of a circuit board. A plurality of contacts are disposed partially in the circuit board receiving area and each contact has a nose section with a wiping surface thereon which is adapted to make electrical contact with a respective conductive element on the circuit board. An actuating assembly is associated with the electrical connector for applying a force outwardly of the circuit board receiving area to move the nose section and respective wiping surface of each contact out of the region of said area to facilitate the insertion of the circuit board into the electrical connector and the withdrawal of the circuit board from the electrical connector.

This invention relates generally to electrical connectors, and more specically to a printed circuit board connector to which a circuit board can be connected, and from which a circuit board can be removed, with a minimum amount of force. The term "circuit board" as used in the description and claims of this application refers to both rigid and flexible members containing conductive elements thereon. For example, flexible cable is encompassed within the scope of such term.

In electronics equipment it is often necessary to make a multitude of connections between circuitry on circuit boards and other external circuitry. Back panel wiring has been utilized for this purpose. This method entails mounting a plurality of circuit board connectors on one side (front side) of a panel for receiving a plurality of printed circuit boards. The contacts of the connectors have wire wrap terminations which project through openings in the panel, and extend outwardly from the other side (back side) of the panel, and an automatic wire wrapping machine is utilized to make the desired electrical connections to said terminations.

Due to the increasing complexity of electronics equipment, a need has developed for circuit board connectors having 100 pairs of contacts, or more. The contacts of each pair are disposed in an insulating member on opposite sides of a circuit board receiving slot, and each contact has a nose section with a wiping surface thereon which is adapted to make electrical connection with a respective conductive element on a circuit board which is inserted into said slot.

A standard circuit board connector for a double sided circuit board, i.e., one containing conductive elements on opposite surfaces of said board, comprises a plurality of pairs of contacts, with the contacts of each pair being positioned on opposite sides of an elongated slot in an insulating member. The nose sections of such contacts, in the inoperative position of the contacts, extend at least partially into the region of the slot of the connector, and in some instanees, such contacts are preloaded in said inoperative position. In said inoperative position, the space between the wiping surfaces on the nose sections of each pair of contacts is less than the thickness of the circuit board; therefore, insertion of the circuit board into the circuit board receiving slot spreads apart the nose sections of each pair of contacts into circuit board engaging position. The electrical connection between the conductive elements on the circuit board and the wiping surfaces on the nose sections of the contacts results from the spring characteristics of the contacts tending to draw such contacts inwardly. Preloading the nose sections of the contacts prevents the nose sections of each pair of contacts from coming into contact with each other to prevent a short circuit when the contacts are in the operative position.

A maximum force of about one pound per contact pair is required to insert the edge of a circuit board between a pair of contacts into the circuit board receiving slot. Therefore, in a connector having 100 pairs of contacts, a maximum insertion force of 100 pounds can be required. A force of this magnitude makes assembly very difficult and can cause the circuit board to bow and/or crack.

Many attempts have been made to develop a suitable connector into which a circuit board can be inserted, and from which a circuit board can be removed, with a minimum amount of force. (Such connectors will hereinafter be referred to as "low insertion force connectors.") These connectors are provided with a cam and/or linkage system (hereinafter referred to as an "actuating assembly") for positively forcing the contacts of said connectors outward to a circuit board receiving position; or, when the contacts are not in the slot area in their inoperative state, to a circuit board engaging position, either by positive force or by releasing a restraint to permit such contacts to move inwardly from a circuit board receiving position to a circuit board engaging position. In the circuit board receiving position, the wiping surfaces on the nose sections of the contacts are disposed out of the circuit board receiving area of the connector. Many of the actuating assemblies which are presently being utilized are quite complex.

Some low insertion force connectors rely on the circuit board to apply the actuating force to the actuating assembly upon insertion of said circuit board into the circuit board receiving area of the connector. Two disadvantages which are inherent in such connectors are. (1) the circuit board insertion force is greater than in connectors wherein the actuating assembly is not actuated by the circuit board; and (2) specially designed circuit boards are often necessary to achieve the actuating function.

Some low insertion force connectors have the actuating assembly mounted to the side walls of the insulator. The forces imposed on the actuating assembly are transmitted to the side walls of the insulator, and can distort said side walls to thereby impair the operation of the connector. To prevent impairment of the connector, the side walls would have to be made thick and rigid, thereby increasing the dimensions of the connector.

In some low insertion force connector, the actuating assembly is mounted on the side of the contacts which is opposite the side nearest the circuit board receiving area of the connector. The dimensions of such a connector are larger than the standard connectors which do not utilize an actuating assembly.

In some low insertion force connectors, two separate actuating means are provided. Each actuating means controls the movement of the contacts on a respective side of the circuit board receiving area.

Previously designed low insertion force connectors have not been able to achieve satisfactory wiping between the conductive elements on the circuit board and the wiping surfaces on the contacts while still retaining the lowest possible insertion force of the circuit board into the circuit board receiving area of the connector.

Objects of this invention are to provide a low insertion force connector (1) into which a circuit board can easily be inserted and from which a circuit board can easily be removed; (2) which is simple in construction, reliable in operation, and compact in design; (3) having an actuating assembly for positively urging the nose sections of the contacts outwardly of the circuit board receiving area of the connector; (4) which can also be used in the conventional manner of a standard connector; (5) having an actuating assembly mounted on the base of the insulator of the connector; (6) having an actuating assembly which is operable independently of the insertion of a circuit board into the circuit board receiving area of the connector; (7) in which satisfactory wiping is achieved between the conductive elements on a circuit board and the wiping surfaces on the nose sections of the contacts without impeding the insertion of said circuit board into the circuit board receiving area of the connector; (8) which can be easily modified to accommodate circuit boards of various lengths; (9) having an actuating assembly which is simple in construction and reliable in operation; (10) having an actuating assembly with a locking feature associated for locking the assembly in a position in which the nose sections of the contacts are in circuit board receiving position.

A further object of this invention is to provide an actuating assembly which is operated by a single actuating means to bias the nose section of contacts which are disposed on opposite sides of a circuit board receiving area into a circuit board receiving position.

A further object of this invention is to provide an actuating assembly which is operable from either above or below the connector.

A further object of this invention is to provide an improved contact for use in a low insertion force connector.

The preferred form of connector of the present invention is comprised of an insulator, said insulator having an insulating cover member and a base member. The insulating cover member has a top surface and a pair of side walls. The top surface has a circuit board receiving area therein, in the form of an elongated slot for receiving the edge of a circuit board. A row of chambers is provided on each side of the circuit board receiving slot for receiving a plurality of contacts. Each contact has a tail section which is mounted within the base member to which the insulating cover member is firmly attached. The nose section of each contact is positioned in a chamber, and each nose section has a wiping surface thereon which is adjacent the board edge receiving slot. An actuating assembly is mounted on the base member and is positioned between the two rows of contacts which are disposed on opposite sides of the board-edge receiving slot. The actuating assembly has two elongated gibs, each gib contacting the nose sections of the contacts in one row of chambers; and a drawbar disposed between said gibs which is mounted for axial movement inwardly and outwardly of the insulating cover member. The gibs and drawbar have complementary cam surfaces, whereby movement of said drawbar in an axial direction outwardly of the insulating cover member effects movement of said gibs away from each other in a direction transverse to said axial direction to bias the nose sections of the contacts out of the region of the circuit board receiving slot to permit easy insertion of an edge of a circuit board into said slot. Movement of the drawbar in the opposite axial direction moves the gibs toward each other to permit the nose sections of the contacts on each side of the circuit board receiving slot to move inwardly so that said nose sections will wipe against the conductive elements on a circuit board positioned within said slot. In the circuit board engaging position of the contacts, the gibs of the actuating assembly do not contact the nose sections of the contacts, therefore only the spring characteristics of the contacts are relied upon to draw the nose sections of each pair of contacts toward each other for making electrical connection with the respective conductive elements on the circuit board. To disconnect the circuit board from the connector, the drawbar is actuated to spread the gibs apart to thereby bias the nose sections of the contacts out of the region of the slot into the circuit board receiving position, and the circuit board is then removed.

The forces imposed on the actuating assembly by the contacts are equal in magnitude and opposite in direction to the forces exerted on the contacts by the gibs and are substantially parallel to the plane of the base member. Thus, the actuating assembly is subjected to compressive forces which are not transmitted to the walls of the insulating member of the connector to cause distortion of said insulating member.

It is understood that the concepts of this invention can be utilized in a connector for use with a circuit board having conductive elements on only one surface thereof. In such a connector only one row of contacts is provided adjacent the board-edge receiving slot and the actuating assembly is comprised of a single gib and a drawbar. The forces imposed on the actuating assembly will be substantially parallel to the base member and in an opposite direction to the forces imposed on the contacts by the actuating assembly. Such forces will not be transmitted to the side walls of the insulating member to distort said member because the drawbar is restricted against transverse movement on the base member.

DRAWINGS

DESCRIPTION

Figures 1, 2A:
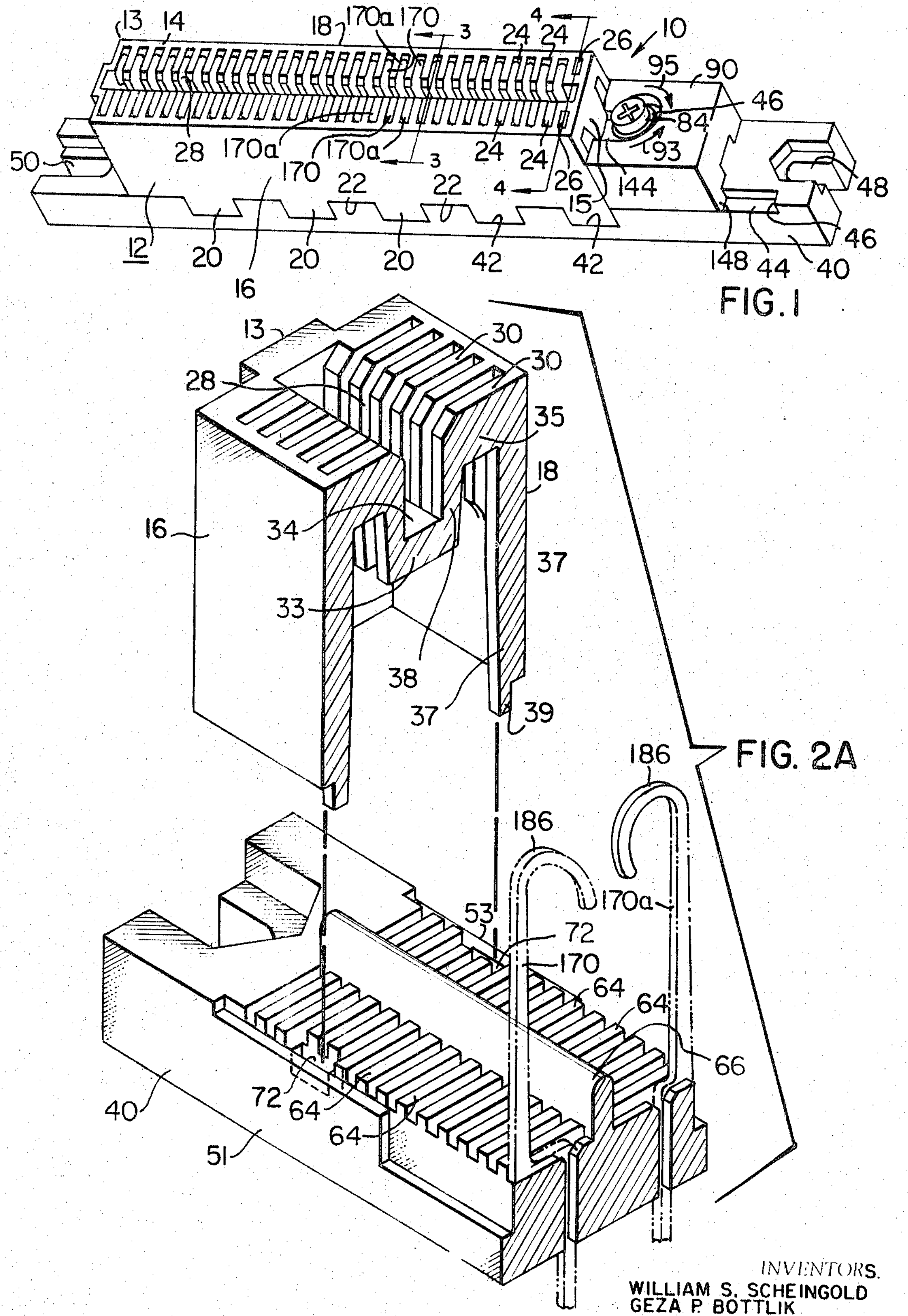
FIG. 1 shows the connector of this invention in perspective view.
FIG. 2A shows a portion of the insulator of the connector, with parts separated to show details of construction.
Figures 3, 4, 5:
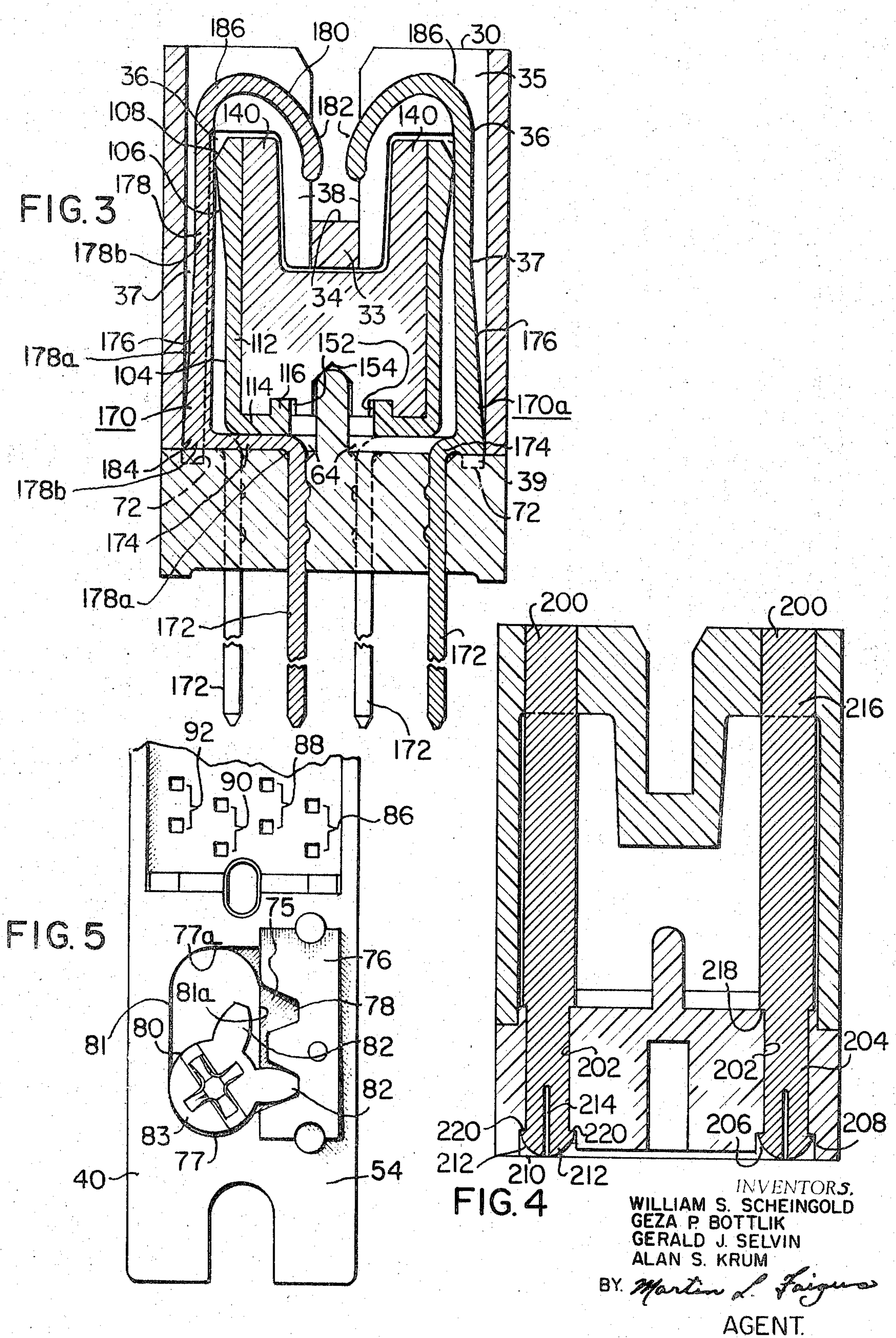
FIG. 3 shows a sectional view of the connector taken through line 3—3 of FIG. 1.
FIG. 4 shows a sectional view of the connector taken through line 4—4 of FIG. 1.
FIG. 5 shows a bottom plan view of a portion of the connector showing the cooperation between the rack and pinion for controlling the operation of the actuating assembly.

FIG. 1 shows a perspective view of the complete printed circuit board connector 10 of this invention. The connector 10 is comprised of an insulator 12, having an insulating cover member 13 and a base 40; an actuating assembly 90; and a plurality of contacts 170, **170*a*** (FIGS. 1 and 3).

The insulating cover member 13 and base 40 of insulator 12 are made from a suitable thermosetting material, such as diallyl phthalate. The insulating cover member 13 is comprised of a top surface 14, side wall 16 and side wall 18 (FIGS. 1 and 2A). The side walls 16 and 18 have a plurality of projections 20 which mate with respective cutout portions 42 in base 40. A plurality of valleys are provided between projections 20, each valley being defined, in part, by a surface 22 which rests on base 40.

A plurality of contact receiving compartments 24 are disposed on both sides of a circuit board receiving slot 28. The compartments 24 are defined, in part, by inverted U-shaped projections 30 (FIGS. 2A and 3) which project inwardly from side walls 16 and 18 to also define a circuit board receiving area in the form of an elongated slot 28. Each inverted U-shaped projection 30 comprises a base 35, and two downwardly, vertically extending legs 37 and 38 (FIG. 3). The legs 38 are interconnected by a longitudinally extending member 33 having an upper surface 34 against which an edge of a circuit board is adapted to seat. The upper portion of each compartment 24 is in communication with the circuit board receiving slot 28 so that a contact which is positioned within one of said compartments can make electrical connection with a respective conductive element on the surface of a circuit board which is inserted into said slot.

The contact receiving compartments 24 are arranged in pairs, with one contact receiving compartment of each pair being disposed on one side of the circuit board receiving slot 28, and the other contact of each pair being disposed on the other side of said circuit board receiving slot. The contact receiving compartments 24 are adapted to receive a plurality of pairs of contacts therein for making electrical connection with conductive elements on opposite sides of a circuit board which is positioned within circuit board receiving slot 28.

The leg 37 of at least one inverted U-shaped projection 30 which is in the region of each valley, extends below surface 22 to form a nib 39 which is received in a corresponding groove 72 in the top surface of base 40 (FIGS. 2A and 3). The insulating cover member 13 is attached to base 40 by inserting the projections 20 and nibs 39 of cover member 13 into cutout portions 42 and grooves 72 of base 40. A suitable bonding agent is used to provide additional retention between the cover member 13 and base 40.

Openings 48 and 50 are provided on opposite axial ends of base 40 to accommodate fastening means for securing the connector to a panel. Base 40 is provided with a series of transverse rib members 64 on the top surface thereof (FIG. 2A). These rib members terminate short of side walls 51, 53 of base 40. The transverse rib members 64 are interrupted along the longitudinal axis of base 40 by an upstanding, longitudinally extending projection 66. The purpose of transverse rib members 64 and upstanding, longitudinally extending projection 66 will be discussed infra.

Two types of contacts **170, 170*a*, are utilized in the connector of this invention (FIGS. 1–3). The contacts are made from a suitable electrically conductive material such as half-hard phosphor bronze, and can either be swaged from wire stock, or stamped from flat strip material. The contacts are arranged in pairs with one contact of each pair being positioned on one side of circuit board receiving slot 28, and the other contact of each pair being positioned on the other side of said circuit board receiving slot. Each pair of contacts comprises a contact 170 and a contact 170*a*** (FIGS. 1 and 3).

Each contact **170, 170*a* comprises a horizontal body section 174 having two end portions 174*a* and 174*b*. A vertically disposed tail section 172, in the form of a wire wrap terminal, projects downwardly from one of said end portions of said body section 174, and a nose section 176 projects upwardly from the other of said end portions of body section 174. The tail section 172 of each contact has a pair of projecting ears for providing a friction fit between the tail section and the base 40 to firmly retain the contacts within said base. The nose section 176 of each contact 170, 170*a* comprises a support arm 178 and a wiping finger 180**.

The support arm 178 projects upwardly from body section 174. One end of the support arm is joined to the body section 174 through a first pivot section 184, which is formed by lengths of said body section and said support arm, and the other end of support arm 178 is joined to wiping finger 180 through a second pivot section 186, which is formed by lengths of said support arm and said wiping finger. The support arm 178 has a tapered lower section **178*a* and a nontapered upper section 178*b*. The wiping finger 180 is inclined downwardly toward body section 174 and outwardly from support arm 178. The extremity of said wiping finger which is remote from said second pivot section has a wiping surface 182 which is adapted to make essentially point contact with a respective conductive element on a circuit board which is positioned within circuit board receiving slot 28**. The wiping surface is formed by coining or otherwise shaping the extremity of the wiping arm.

In the preferred embodiment of the contacts of this invention, the transverse spacing between the center of wiping finger 180 adjacent wiping surface 182 and the center of support arm 178 is approximately 0.151 inch. The length of the support arm is approximately 0.507 inch, and the wiping surface of the wiping finger is vertically positioned 0.406 inch above body section 174.

This construction permits a wiping action between the wiping surface 182 of each contact and a respective conductive element on the circuit board positioned within circuit board receiving slot 28. This wiping action removes any oxide film which may be present on the wiping surface of the contact and/or the conductive element on the circuit board to insure good electrical connection between each contact and the respective conductive element on the circuit board. "Wiping" refers to relative movement between the wiping surface of each contact and a respective conductive element on the circuit board from the time the wiping surface initially contacts said respective conductive element until said contact reaches its at rest, circuit board engaging position. The wiping action between each contact and a respective conductive element on the circuit board is effected by pivotal movement between the support arm 178 and the body section 174 about first pivot section 184, and between the wiping finger 180 and support arm 178 about second pivot section 186.

For the contact of the present invention, the length of wipe ($w$) is defined by the equation:

$$w=\Delta P\left\{\frac{1}{1-3\left(\frac{f}{L}\right)+3\left(\frac{f}{L}\right)^2}\left(\frac{I_1}{I_2}\right)\left(\frac{d}{L}\right)\left[1-\left(\frac{f}{L}\right)\right]\sqrt{\left(\frac{d}{L}\right)^2+\left[1-\left(\frac{f}{L}\right)\right]^2}\right\}$$

wherein $\Delta P$ is the displacement of the wiping surface 182, in a direction perpendicular to the circuit board, from a position in the region of the circuit board receiving slot, when the contact is in its inoperative, unloaded condition, to the position said wiping surface assumes when it is in its circuit board engaging position; $I_1$ is the moment of inertia of the support arm 178; $I_2$ is the moment of inertia of the wiping finger 180; $L$ is the length of the support arm 178; $f$ is the vertical distance between the wiping surface 182 and the body section 174; and $d$ is the transverse spacing between the center of wiping finger 180 adjacent wiping surface 182 and the center of support arm 178. Substituting the dimensions of the preferred embodiment of the contacts of this invention, which were given above, into the above equation, results in the following solution:

$$w=.114\ \Delta P$$

Under normal operating conditions, the displacement of the wiping surface $\Delta P$, is sufficient to provide satisfactory wipe between the wiping surface of the contact and the conductive elements on the circuit board.

In a standard connector, wiping is achieved by the relative movement between the wiping surface of each contact and a respective conductive element on the circuit board when the board is inserted into the receiving slot. In the connector of the present invention, the contacts will provide sufficient wiping action to break any oxide film which may be present even though the contacts do not impede insertion of the board into the slot.

The only difference between the contacts 170 and the contacts **170*a* is that the body section 174 of each contact 170 is longer than the body section 174 of each contact 170*a***.

Every other contact which is positioned on one side of circuit board receiving slot 28 is of the 170 type, and the other contacts on said one side are of the 170*a* type (FIG. 1). Every other contact on the other side of the circuit board receiving slot is of the 170 type, and the other contacts on said other side are of the 170*a* type (FIG. 1). This arrangement of contacts, accompanied by the fact that one contact of each pair of contacts is of the 170 type, and the other contact of each pair of contacts is of the 170*a* type (FIGS. 1 and 3), results in the tail sections 172 of the contacts which projects through the bottom of base 40 being disposed in four parallel rows 86, 88, 90, 92 (FIGS. 3 and 5). By utilizing this arrangement of contacts, the nose sections of the contacts can be positioned in rows on .050 inch centers, and the tail sections of the contacts in each row, 86, 88, 90 and 92, can be positioned on .100 inch centers to facilitate the automatic wire wrapping operation.

FIGS. 1, 2B, 2C and 3 show details of construction of the actuating assembly 90. Actuating assembly 90 is mounted on base 40 and extends into the insulating cover member 13 between the pairs of contacts 170, 170*a*. The actuating assembly 90 comprises movable preloading means in the form of a pair of gibs 91. The actuating assembly further comprises an actuating means in the form of a drawbar 130 which is positioned between the gibs 91. The gibs and drawbar are made from any suitable material, such as glass-filled polyamide.

Figures 2B, 2C:
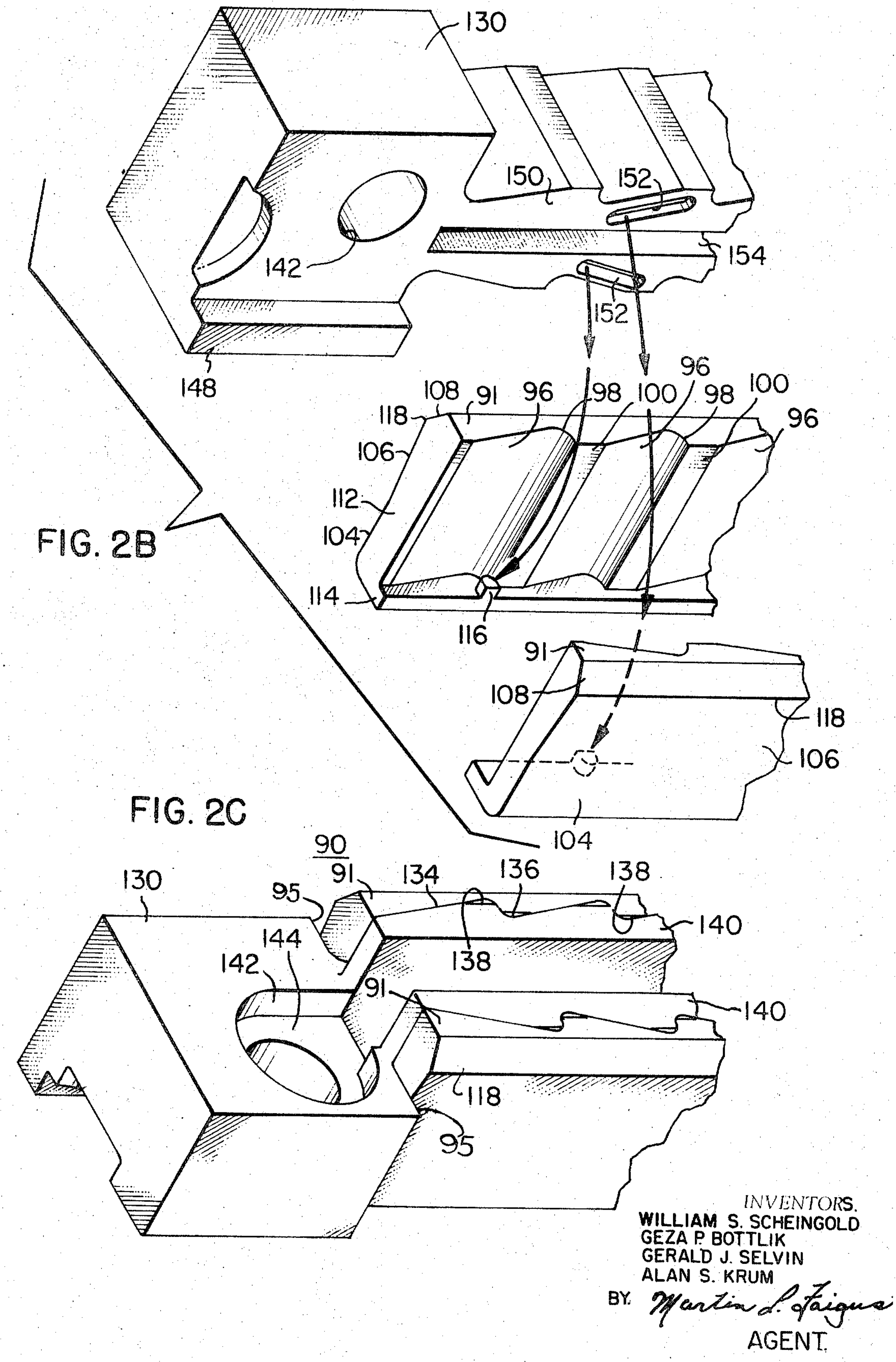
FIG. 2B shows a portion of the actuating assembly of the connector with parts separated to show details of construction.
FIG. 2C shows a portion of the actuating assembly of the connector in assembled condition to show the cooperation of parts.

Each gib is positioned adjacent a row of contacts, and is comprised of a vertical upright portion 112, a horizontal lower portion 114, and projections 116 extending upwardly from horizontal lower portion 114 (FIGS. 2B and 3). The horizontal lower portions 114 of gibs 91 are disposed to seat on the upper surfaces of transverse rib members 64 (FIGS. 2A and 3), which are, preferably, integrally molded with base 40.

The vertical upright portion of each gib 91 comprises an outer surface which has a straight surface portion 104, extending upwardly from the horizontal lower portion 114; an inclined surface portion 106, extending from said straight surface portion 104, and inclined toward the row of contacts with respect to which such gib is adjacent; and a second inclined surface portion 108, extending from said first inclined surface 106 away from said row of contacts.

Inclined surface portion 106 and 108 of each gib meet at a cam surface 118 which is adapted to contact the nose sections of the contacts in a respective adjacent row for moving the nose sections of the contacts between a first position, wherein the nose section of each contact is at least partially disposed within the circuit board receiving slot 28, and a second circuit board receiving position, wherein the nose section of each contact is biased to a position out of said slot to facilitate the insertion of a circuit board into said slot, and the removal of a circuit board from said slot. In the preferred embodiment of this invention, the gibs 91 are in direct contact with the nose section of each contact when the contacts are in the first position, and apply a preload force on the nose sections of the contacts in a direction outwardly of the circuit board receiving slot.

The vertical upright portion 112 of each gib has an inner surface which is comprised of inclined cam surfaces 96, a relief surface 98 adjacent one side of each inclined cam surface 96, and a flat surface 100 adjacent the opposite side of each inclined cam surface 96 (FIGS. 2B and 2C).

Drawbar 130 is comprised of upstanding legs 140 (FIGS. 2C and 3) which are received in U-shaped recesses 36 defined by the inverted U-shaped projections 30 (FIGS. 2A and 3). The bottom surface 150 of drawbar 130 has a plurality of cam grooves 152 therein (FIGS. 3 and 2B) for receiving projections 116 of gibs 91 (FIGS. 2B and 3). The drawbar has side surfaces positioned adjacent the inner surface 94 of each gib 91. The side surfaces of drawbar 130 are comprised of a plurality of inclined cam surfaces 134 which are complementary to cam surfaces 96 on the gibs; a relief surface 136 adjacent one side of each inclined cam surface 134; and a flat surface 138 adjacent the other side of each inclined cam surface 134.

The relief surfaces 98 on gibs 91 and the relief surfaces 136 on drawbar 130 are provided to prevent binding between the drawbar and the gibs, which otherwise would hinder movement of the drawbar in an axial direction outwardly of said gibs.

A longitudinally extending slot 154 is provided in the bottom surface 150 of drawbar 130 (FIGS. 2B and 3) for receiving the upstanding, longitudinaly extending vertical projection 66 which is, preferably, formed integral with base 40 (FIGS. 2A and 3).

One end of the drawbar 130 (hereinafter referred to as the actuating end) is provided with an opening 142 (FIGS. 2B and 2C) for receiving actuating screw 84 (FIG. 1). The opening 142 is in direct alignment with a longitudinally extending elongated opening 74 which extends through base 40 (FIG. 5). Opening 74 is countersunk from the bottom surface 54 of base 40 to provide an open portion adjacent opening 74 for receiving a steel rack insert 76 having cutout portions 78 therein (FIG. 5). The open portion is defined, in part, by a bottom surface 75.

The opening 142 in drawbar 130 is countersunk to provide a shoulder 144 (FIGS. 1 and 2C). The actuating screw is inserted from the underside of base 40 through opening 142 in the drawbar, and a retaining ring 46 (FIG. 1) is positioned about a reduced portion on the outer periphery of actuating screw 84 (not shown). The retaining ring 46 rests on shoulder 144. The lower portion of actuating screw 84 is comprised of a pinion 80 having a circular portion 83 with projections 82 extending therefrom which seat on the bottom surface 75. The cooperation between retaining ring 46 and shoulder 144, and between projections 82 and bottom surface 75, holds the actuating screw in place within the openings 142 and 74. The longitudinally extending elongated opening 74 has two arc portions 77, 77*a*. The radius of the arc portions are equal to the radius of the circular portions 83 of pinion 80. The opening 74 is further defined by parallel side surfaces 81, 81*a*, which are spaced from each other a distance equal to the diameter of circular portion 83 of pinion 80.

FIG. 5 shows the relationship between the rack insert 76, the pinion 80, and the opening 74 when the drawbar 130 is in its most outward position with respect to insulating cover member 13. In this position the circular portion 83 of pinion 80 mates with complementary arc portion 77 of opening 74 to provide a positive limit means for limiting movement of the drawbar out of the insulating cover member 13. Movement of the drawbar 130 in an axial direction inwardly of the insulating cover member is limited by the mating of surfaces 95 on the actuating end of drawbar 130 with front face 15 of the insulating cover member 13. This arrangement provides primary limit means for limiting axial movement of the drawbar both inwardly and outwardly of insulating cover member 13.

The head portion of actuating screw 84 is provided with cross-slot for accommodating either a conventional screw driver or a phillips-head screw driver for effecting axial movement of the drawbar 130 (FIG. 1). The circular portion 83 of pinion 80 is provided with similar cross-slots so that axial movement of the drawbar can also be effected from the bottom of base 40. Other head designs can be utilized for receiving other tools for effecting axial movement of the drawbar.

Secondary limit means are provided for limiting axial movement of the drawbar in an axial direction outwardly of insulating cover member 13. The lower surface of the actuating end of drawbar 130 is provided with a projection 148 for mating with a complementary groove 44 in base 40 (FIG. 1). The groove 44 has a rear wall 46 which limits axial movement of the drawbar outwardly of insulating cover member 13. The provision of projection 148 mounted in groove 44 also adds stability to the base-drawbar assembly.

An actuating assembly comprising a drawbar and only a single gib can be utilized to effect the camming action of contacts located on opposite sides of the circuit board receiving slot 28. The single gib has the same configuration as each gib 91, described above. The drawbar is modified in the following respects from the drawbar 130 disclosed above. Only one side surface of the drawbar is comprised of cam surfaces which are complementary to the cam surfaces 134 of the gib. The other side surface can either be a flat, planar surface or have a cam surface which is similar to cam surface 118 of each gib 91. The projections on the gib will be inserted into the cam grooves on the bottom surface of the drawbar with the cam surfaces on said gib being adjacent to the complementary cam surfaces on the side surface of said drawbar. In addition to the cam grooves in the bottom surface of the drawbar which receive the projections on the gibs, the bottom surface of the drawbar is provided with additional cam grooves which are adapted to mate with upstanding projections on the top surface of base 40.

In this embodiment, the base 40 does not have a longitudinally extending projection, such as 66, and the bottom surface of the drawbar does not have a longitudinally extending slot, such as 154, for receiving said longitudinal extending projection. The additional cam grooves in the bottom surface of the drawbar, and the upstanding projections on the top surface of base 40 replace the longitudinally extending slot 154, and the longitudinally extending projection 66, respectively. The actuating assembly is inserted between the two rows of contacts of the electrical connector, with the gib positioned adjacent one row of contacts, and the side surface of the drawbar which does not have complementary cam surfaces to cam surfaces 134 of said gib, adjacent the other row of contacts. Longitudinal movement of the drawbar in either axial direction causes both the drawbar and the gib to move in a transverse direction to said axial direction. Therefore, movement of said drawbar in one axial direction will cause the gib and drawbar to move in a transverse direction away from each other to bias the contacts outwardly of the circuit board receiving slot, while movement of said drawbar in the other axial direction will cause said gib and drawbar to move inwardly toward each other in a transverse direction to permit the contacts to move inwardly toward said circuit board receiving slot.

Any suitable mechanism can be utilized to effect the axial movement of said drawbar. For example, the actuating end of said drawbar can be gripped by a pliers or other suitable instrument for effecting the axial movement of said drawbar.

Openings 26 are provided in the insulating cover member 13 in direct alignment with openings 202 in base 40 to receive gib retainers 200 (FIG. 4). These gib retainers are placed through the insulating cover member 13 and base 40 to prevent the gibs from being pulled out of the insulating cover member 13 when the drawbar is moved in an axial direction outwardly of said insulating cover member. The lower portion of opening 202 in base 40 is countersunk at 206 to provide a rearwardly facing shoulder 208. The gib retainers 200 each have an upper portion 216 and a lower portion 204 defining a rearwardly projecting shoulder 218 at their junction. Tips 210 at the lower extremities of the lower portions 204 of each gib retainer are each comprised of a pair of fingers 212 separated by a slot 214 to provide a resilient connection between said fingers. Each finger has an upwardly facing shoulder 220 associated therewith.

Upon insertion of each gib retainer 200 into the connector, the fingers 212 will be compressed by the wall defining each opening 202 until the fingers 212 reach the countersunk portion 206 of each opening 202, at which time the fingers will spring outwardly causing the upwardly facing shoulders 220 on each finger 212 to engage the downwardly projecting shoulder 208 of each opening 202. In this position, the downwardly facing shoulders 218 defined at the junction between the upper portion 216 and the lower portion 204 of each gib retainer 200 will seat on the upper surface of base 40. Each gib retainer 200 is positioned adjacent the end of a respective gib to prevent the gib from being withdrawn from the insulating member upon actuation of the drawbar in an axial direction outwardly of said insulating cover member.

OPERATION

The connector of this invention operates in the following manner. In the inoperative condition of the connector, the gibs 91 are in their closest spaced position. In this position the inclined cam surfaces 96 on gibs 91 are adjacent to and in contact with the complementary inclined cam surfaces 134 on the drawbar 130, the flat surfaces 100 on gibs 91 are adjacent relief surfaces 136 on the drawbar 130, and the relief surfaces 98 on gibs 91 are adjacent the flat surfaces 138 on the drawbar 130. The gibs are also in contact with the nose section of each contact for applying a preload force thereon, and the nose section of each contact is at least partially disposed within the circuit board receiving slot 28.

Prior to insertion of a circuit board into the circuit board receiving slot 28, a screw driver is utilized to rotate the actuating screw 84 in the direction indicated by arrow 93 (FIG. 1) to move the drawbar axially outwardly of the insulating cover member 13. This causes the inclined cam surfaces 96 on the gibs 91 to move along the inclined cam surfaces 134 of the drawbar to a position wherein the flat surfaces 100 on the gibs mate with the flat surfaces 138 on the drawbar, at which point said gibs are locked in their furthest spaced condition. The nose sections of the contacts are biased out of the region of the circuit board receiving slot 28 into the circuit board receiving position.

After the board has been inserted into the slot, the drawbar is moved inwardly in an axial direction by rotation of actuating screw 84 in the direction indicated by arrow 95 (FIG. 1). The mechanical connection between the gibs 91 and the drawbar 130, through projections 116 on said gibs and cam grooves 152 in the base of said drawbar, causes the gibs to move inwardly to their original closest spaced condition.

When the circuit board is in slot 28, the contacts will be biased in an outward direction due to engagement between said circuit board and said contacts and said contacts will be out of engagement with the cam surface 118 on each of the gibs 91. Thus, the normal resiliency of the contacts is relied upon to draw such contacts inwardly toward the slot to provide the wiping action and the electrical connection between the contacts and the conductive elements on the circuit board.

To remove the circuit board, the drawbar is moved outwardly of the insulating cover member in an axial direction to move the gibs 91 outwardly against the nose sections of the contacts to move said nose sections out of the region of slot 28. The board can then be easily removed from the connector.

Due to the tolerance requirements in designing the connector of this invention, a circuit board, having 100 pairs of contacts will only encounter a maximum insertion force of only approximately 5 pounds. A maximum torque of only 15 pounds is required to spread the nose sections of the 100 pairs of contacts to the circuit board receiving position. Also, the forces imposed on the actuating assembly will not be transmitted to the walls of the insulating casing, thereby to avoid distortion of the connector. The connector of this invention is extremely compact since the actuating is positioned in the area defined by the space between the pairs of contacts.

Many modifications can be made within the purview of this invention. The connector of this invention can be easily modified to accommodate a wide variety of circuit board sizes. To reduce the length of a connector, that part of the connector which is not needed can be severed from the main body of the connector and a side enclosure can be attached by a suitable bonding agent to the severed end of said main body portion. One severing operation can be utilized to cut off the unwanted contact receiving compartments and the corresponding portion of the actuating assembly.

The connector can be enlarged by interconnecting any number of individual connectors by an adapter member having a circuit board receiving slot therein.

The connector can also be modified for use with a circuit board having conductive elements on only one surface thereof. In such a connector only one row of contacts is provided adjacent one side of a circuit board receiving slot, and the actuating assembly is comprised of a single gib and a drawbar. The mode of operation of such a connector is the same as described above.

The insulator 12 of the connector of this invention can be molded as a single unitary structure.

The actuating assembly can be designed so that axial movement of the drawbar inwardly of the insulating cover member 13 will expand the gibs to bias the nose sections out of the circuit board receiving slot and axial movement of the drawbar outwardly of the insulating cover member 13 will retract the gibs to permit the nose sections of the contacts to move inwardly into the circuit board receiving slot.

Also, other contacts than the ones specifically disclosed in this application can be utilized in the connector of this invention, and other means besides the ears on the tail section can be utilized to hold the contacts in the insulator.

The above description is intended to be illustrative only and is not intended as a limitation on the scope of protection to which applicants are entitled. Many modifications can be made within the purview of this invention.

We claim:

1. A low insertion force electrical connector for use with a circuit board having conductive elements on at least one surface adjacent an edge of the board, comprising:

(a) an insulating housing defining a longitudinally extending circuit board receiving area for receiving said edge of the printed circuit board;

(b) a plurality of contacts mounted in said housing, each of said contacts having a nose section which has a wiping surface thereon and which is moveable from a first position at which the wiping surface is at least partially disposed within said circuit board receiving area to a second position at which the wiping surface is out of said circuit board receiving area;

(c) a longitudinally extending gib mounted for transverse movement on said housing and having first and second cam surfaces, said first cam surface being engageable with the nose section of each contact for applying a pre-load force to the nose sections in a direction outwardly of the circuit board receiving area and for moving said contacts to their second position when said gib is moved to a first position; and (d) a drawbar mounted for axial movement in said housing in a direction parallel to said longitudinally extending gib, said drawbar having cam surface means cooperable with said second cam surface on said gib for moving said gib to its first position in response to axial movement of said drawbar in one direction, and for effecting, in response to axial movement of said drawbar in the opposite direction, movement of said gib to second position at which said contacts are returned to their first position.

2. The electrical connector of claim 1, wherein interconnection means are provided between said gib and said drawbar for allowing said gib to move from said first position to said second position upon movement of said drawbar in one axial direction, and for positively moving said gib from said second position to said first position upon movement of said drawbar in the other axial direction.

3. The electrical connector of claim 1, wherein said cam surface means on said drawbar comprises a plurality of inclined cam surfaces, and said second cam surface means on said gib comprises a plurality of inclined cam surfaces which are complementary to said cam surfaces on said drawbar, whereby movement of said drawbar in one axial direction causes the inclined cam surfaces on said gibs to ride along the inclined cam surfaces on said drawbar to effect movement of said gib in a direction from said first position to said second position.

4. The electrical connector of claim 3, wherein each inclined cam surface on said drawbar and said gib is followed by a flat surface which lies in a plane that is parallel to the axial direction of movement of said drawbar, whereby movement of said drawbar in said one axial direction causes the inclined surfaces on said gib to ride along the inclined cam surfaces on said drawbar to a position wherein the flat surfaces on said gib mate with the flat surfaces on said drawbar at which point said gib is locked in said second position.

5. The electrical connector of claim 3, wherein interconnection means are provided between said gib and said drawbar for allowing said gib to move from said first position to said second position upon movement of said drawbar in said one axial direction, and for positively moving said gib from said second position to said first position upon movement of the drawbar in the other axial direction.

6. The electrical connector of claim 5, wherein said interconnection means compirses a series of cam grooves in the base of said drawbar, and a series of projections on said gib projecting into said cam grooves.

References Cited

UNITED STATES PATENTS

| | | | |
|---|---|---|---|
| 1,383,128 | 6/1921 | Larsen | 70—46 |
| 2,879,494 | 3/1959 | Teetor | 339—37 |
| 3,366,916 | 1/1968 | Oktay | 339—74 |
| 3,395,377 | 7/1968 | Straus | 339—17(L) |
| 3,426,313 | 2/1969 | Mycheck | 339—74 |

FOREIGN PATENTS

| | | | |
|---|---|---|---|
| 1,118,852 | 12/1961 | Germany | 339—74 |

MARVIN A. CHAMPION, Primary Examiner

J. H. McGLYNN, Assistant Examiner

U.S. Cl. X.R.

200—166; 339—176